(12) United States Patent
Kamis

(10) Patent No.: US 12,338,780 B2
(45) Date of Patent: Jun. 24, 2025

(54) ELECTRO-HYDROSTATIC ACTUATION SYSTEM FOR A THRUST REVERSER FOR AN AIRCRAFT TURBOJET ENGINE NACELLE

(71) Applicant: SAFRAN LANDING SYSTEMS, Velizy-Villacoublay (FR)

(72) Inventor: Jean-Baptiste Kamis, Moissy-Cramayel (FR)

(73) Assignee: SAFRAN LANDING SYSTEMS, Velizy-Villacoublay (FR)

( * ) Notice: Subject to any disclaimer, the term of this patent is extended or adjusted under 35 U.S.C. 154(b) by 0 days.

(21) Appl. No.: 18/556,057

(22) PCT Filed: Apr. 11, 2022

(86) PCT No.: PCT/FR2022/050686
§ 371 (c)(1),
(2) Date: Oct. 18, 2023

(87) PCT Pub. No.: WO2022/223904
PCT Pub. Date: Oct. 27, 2022

(65) Prior Publication Data
US 2024/0200508 A1  Jun. 20, 2024

(30) Foreign Application Priority Data
Apr. 20, 2021 (FR) ...................... 2104072

(51) Int. Cl.
*F02K 1/76* (2006.01)
*F15B 7/00* (2006.01)
*F15B 20/00* (2006.01)

(52) U.S. Cl.
CPC ............. *F02K 1/763* (2013.01); *F15B 7/003* (2013.01); *F15B 7/006* (2013.01); *F15B 20/00* (2013.01);
(Continued)

(58) Field of Classification Search
CPC .......... F02K 1/763; F02K 1/766; F15B 7/003; F15B 7/006; F15B 20/00;
(Continued)

(56) References Cited

U.S. PATENT DOCUMENTS 4,391,409 A * 7/1983 Scholz .................... F02K 1/763
239/265.29
4,409,884 A * 10/1983 Boehringer ............. F01B 25/04
91/401
(Continued)

FOREIGN PATENT DOCUMENTS

EP  3 333 400 A1  6/2018
FR  2 889 266 A1  2/2007

OTHER PUBLICATIONS

International Search Report mailed Jul. 13, 2022, issued in corresponding International Application No. PCT/FR2022/050686, filed Apr. 11, 2022, 6 pages.
(Continued)

*Primary Examiner* — Jesse S Bogue
(74) *Attorney, Agent, or Firm* — CHRISTENSEN O'CONNOR JOHNSON KINDNESS PLLC

(57) ABSTRACT

A thrust reverser device for an aircraft turbojet engine nacelle an electro-hydrostatic actuation system that includes a motor pump and a first actuation assembly. The first actuation assembly includes a series of at least two actuators configured to be attached to a movable cover of the thrust reverser and to move the movable cover or covers between a retracted position and a deployed position relative to the nacelle. The first electro-hydraulic actuation system further includes a volumetric flow divider with an inlet connected to the motor pump and at least two outlets, wherein each outlet is connected to an actuator. The volumetric flow divider is
(Continued)

configured to receive a fluid and to supply the fluid to the actuators with an equal flow rate.

11 Claims, 4 Drawing Sheets

(52) U.S. Cl.
CPC ............... *F15B 2211/20515* (2013.01); *F15B 2211/20561* (2013.01); *F15B 2211/40523* (2013.01); *F15B 2211/426* (2013.01); *F15B 2211/428* (2013.01); *F15B 2211/7057* (2013.01)

(58) Field of Classification Search
CPC .. F15B 2211/20515; F15B 2211/20561; F15B 2211/40523; F15B 2211/426; F15B 2211/428; F15B 2211/7057; F15B 15/18; F05D 2260/406; Y02T 50/60
See application file for complete search history.

(56) References Cited

U.S. PATENT DOCUMENTS

| | | | | |
|---|---|---|---|---|
| 4,585,172 A | * | 4/1986 | Gazzera | F15B 11/22 92/5 L |
| 5,609,020 A | * | 3/1997 | Jackson | F02K 1/76 244/110 B |
| 6,786,315 B1 | * | 9/2004 | Christensen | F02K 1/763 239/265.29 |
| 6,837,054 B2 | * | 1/2005 | Brocard | F15B 9/10 60/771 |
| 6,922,992 B1 | | 8/2005 | Morgan | |
| 8,170,771 B2 | * | 5/2012 | Calmelat | F02K 1/76 701/100 |
| 8,240,141 B2 | * | 8/2012 | Cros | F15B 13/023 60/403 |
| 9,266,420 B2 | | 2/2016 | Edward | |
| 9,494,173 B2 | | 11/2016 | Pavillet et al. | |
| 10,227,951 B2 | * | 3/2019 | Kopecek | F02K 1/763 |
| 10,288,007 B2 | * | 5/2019 | Kopecek | F02K 1/58 |
| 11,326,554 B2 | * | 5/2022 | DeMichele | F02K 1/766 |
| 11,339,788 B2 | * | 5/2022 | Babbitt | B01D 61/10 |
| 2012/0090311 A1 | * | 4/2012 | Le Coq | F01D 17/20 60/484 |
| 2013/0087411 A1 | | 4/2013 | Shade | |
| 2015/0090810 A1 | * | 4/2015 | Lallement | F02K 1/763 239/265.19 |
| 2018/0298924 A1 | * | 10/2018 | Le Coq | F02K 1/763 |
| 2022/0364526 A1 | * | 11/2022 | Kopecek | F02K 1/76 |

OTHER PUBLICATIONS

Written Opinion mailed Jul. 13, 2022, issued in corresponding International Application No. PCT/FR2022/050686, filed Apr. 11, 2022, 5 pages.

English translation of Written Opinion mailed Jul. 13, 2022, issued in corresponding International Application No. PCT/FR2022/050686, filed Apr. 11, 2022, 5 pages.

International Preliminary Report on Patentability mailed Oct. 24, 2023, issued in corresponding International Application No. PCT/FR2022/050686, filed Apr. 11, 2022, 6 pages.

\* cited by examiner

ELECTRO-HYDROSTATIC ACTUATION SYSTEM FOR A THRUST REVERSER FOR AN AIRCRAFT TURBOJET ENGINE NACELLE

FIELD OF THE DISCLOSURE

The present disclosure relates to an electro-hydrostatic actuation system for a thrust reverser device for an aircraft turbojet engine nacelle, to a thrust reverser device equipped with such an electro-hydrostatic actuation system and to an aircraft comprising such a thrust reverser device.

BACKGROUND

The technical background comprises in particular the documents U.S. Pat. No. 9,494,173 B2, US 2013/0087411 A1, U.S. Pat. No. 9,266,420 B2, U.S. Pat. No. 6,922,992 B1 and FR 2889266 A1.

An aircraft is propelled by one or more turbojet engines, each housed in a nacelle containing an assembly of ancillary actuation devices that ensure various functions when the turbojet engine is running or stopped.

These ancillary actuation devices comprise a mechanical thrust reverser system.

FIG. 1 shows an example of a turbojet engine nacelle in the prior art. Such a nacelle 1 housing a turbojet engine 3 generally has a substantially tubular structure comprising an upstream section 5 defining an air inlet, a middle section 7 intended to surround a fan of the turbojet engine, a downstream section 9 intended to surround the combustion chamber of the turbojet engine and possibly incorporating thrust reversing means, and is generally terminated by an ejection nozzle, the outlet of which is located downstream of the turbojet engine. Each propulsion assembly is attached to the aircraft by a pylon, not shown, generally located under a wing or at the level of the fuselage. In the present application, upstream and downstream are defined in relation to the direction of air flow in the propulsion assembly during direct jet operation, the air inlet being located upstream in relation to the ejection nozzle, located downstream of the nacelle.

The modern nacelles are intended to house a double flow turbojet engine configured to generate a flow of hot air F1, referred to as the primary flow, by means of the gas generator, and a flow of cold air F2, referred to as the secondary flow, by means of the blades of the rotating fan, which circulates outside the turbojet engine 3 through an annular channel defining a circulation duct 15 for the secondary air flow. The duct 15 is delimited between an internal fairing 17 of the turbojet engine and an internal wall of the nacelle. The two air flows F1 and F2 are ejected from the turbojet engine 3 from the rear of the nacelle via this air flow duct.

The role of a thrust reverser, when an aircraft lands, is to improve its braking capacity by redirecting forward at least a portion of the air ejected from the turbojet engine. During this phase, the reverser obstructs at least a portion of the air flow duct and directs this flow towards the front of the nacelle, generating a counter-thrust in addition to the braking of the wheels of the aircraft.

The means implemented to carry out this redirection of the flow vary according to the type of reverser. However, in general, the structure of a reverser comprises at least one movable reverser cover that can be moved between, on the one hand, a deployed position or reverse jet position in which it opens a passage in the nacelle for the diverted air flow, and, on the other hand, a retracted position or direct jet position in which it closes this passage.

In the thrust reverser devices with doors, each movable cover pivots in such a way as to block the flow and divert it, and is therefore active in this reorientation.

In the case of a reverser with deflection grids, such as the one equipped to the nacelle shown in FIG. 1, the airflow is redirected into the reverse jet position by deflection grids 20, associated with inversion flaps 22 which at least partially come to block the air flow duct. The mobile cover 24 (commonly referred to as a "transcowl") slides so that when it moves backwards during the opening phase, it uncovers deflector vane grids arranged in the thickness of the nacelle. A system of connecting rods links this movable cover to the reversing flaps or blocking doors that deploy inside the ejection channel and block the direct flow outlet.

FIG. 2 and the lower portion of FIG. 1 illustrate a nacelle equipped with a grid reverser in the retracted position, while FIG. 3 and the upper portion of FIG. 1 illustrate the same nacelle in the deployed position, with one or more elements forming the cover 24 being slid along rails in a downstream direction to uncover the deflection grids 20 which deflect the secondary air flow (cold flow) from the engine towards the upstream of the nacelle.

Classically, these elements forming a reverser cover are actuated by means of a plurality of mechanical actuators (typically of the ballscrew type) or hydraulic actuators (of the piston type) distributed around the periphery of the nacelle, controlled by a hydraulic generation circuit connected to the general hydraulic circuit of the aircraft, or by an electrical generation circuit connected to the general electrical circuit of the aircraft.

Hydraulic generation means that the energy source is hydraulic, while the actuators can be controlled hydraulically (hydraulic actuator) or mechanically (hydraulic motor acting on mechanical actuator). Similarly, by electrical generation, we mean that the energy source is electrical, while the actuators can be controlled mechanically (electric motor acting on a mechanical actuator) or hydraulically (electric motor acting on a hydraulic motor by means of a hydraulic pump).

As is well known, these actuators are kinematically connected together, typically by flexible shafts (usually referred to as flexshafts) in the case of mechanical actuators, so that the control of one of them also results in the control of the others.

The prior art document FR 2 947 870 describes an actuation system for a movable element of an aircraft engine nacelle, such as a thrust reverser cover, allowing to compensate for a failure in the hydraulic or electrical generation circuit of the actuators, so that the function performed by the actuated element is not affected.

A system for actuating a thrust reverser comprises, for example, linear hydraulic actuators having an internal locking mechanism, an external locking mechanism, a hydraulic control unit HCU containing isolation and directional control valve functions, a synchronization mechanism by means of flexible synchronization shafts in particular, manual drives for maintenance purposes and associated plumbing elements up to the interfaces of the pylons.

In order to obtain a correct movement of the movable element or elements forming the cover, all the actuators must be synchronized, in particular to avoid an overloading on the structure of the nacelle. This synchronization is achieved in particular by means of a flexible shaft of substantially circular shape connecting the actuators together and running along the internal wall of the nacelle.

For most hydraulic thrust reverser systems, the synchronization accuracy required between all the actuators is around 3 mm.

In particular, the aim of the present disclosure is to offer an actuation system for a thrust reverser device that is easier to install than the system in the prior art, in particular by doing away with the mechanical synchronization system, comprising gears and joints, which is consequently heavy and complicated, while complying with the safety and performance requirements of the aeronautical field.

SUMMARY

To this end, the disclosure relates to a thrust reverser device for an aircraft turbojet engine nacelle comprising at least one cover movable between a retracted position and a deployed position with respect to the nacelle and an electro-hydrostatic actuation system, the electro-hydrostatic system comprising a motor pump, and a first actuation assembly formed of:
- a series of at least two actuators intended to be attached to a movable cover of the thrust reverser device and configured to move the movable cover or covers between a retracted position and a deployed position relative to the nacelle; and
- a volumetric flow divider having an inlet connected to the motor pump and at least two outlets, each connected to an actuator, the volumetric flow divider being configured to receive a fluid and to supply the actuators with a fluid substantially equitably in flow rate.

The disclosure allows to replace the mechanical synchronization device comprising a synchronization shaft connecting all the actuators with an electro-hydrostatic (EHA) actuation system comprising at least one volumetric flow divider in order to ensure the synchronization of the actuators and therefore the movement of the movable cover.

The advantage of this system is that it simplifies the installation of the electro-hydrostatic actuation system for a thrust reverser device, while complying with the safety and performance requirements of the aeronautical industry.

The volumetric flow dividers allow the fluid flow to be divided equally, whatever the inlet pressure, and very precisely. They have the advantage of not being affected by the loads on the cover of the reversing device and are very accurate.

Such an electro-hydrostatic actuation (EHA) system can supply just the right flow rate and pressure to the actuators when the counteracting loads are present and can operate instantaneously as an electrical generator when the actuators face auxiliary loads allowing to improve the electrical power management of the system.

Advantageously, the motor pump is controlled by a drive unit for driving the motor which transforms the electrical supply bus of the aircraft into a three-phase bus for controlling the motor.

In addition, such an electro-hydrostatic actuation system according to the disclosure has the advantage of being totally independent of the hydraulic circuit of the aircraft. So, in terms of installation, the motor pump assembly can be advantageously installed in the pylon with the hydraulic bloc. This block will be smaller than the current one because no common mode will occur, unlike the existing systems in the prior art.

In addition, the synchronization shaft of the current systems is eliminated, allowing the use of simpler, less expensive actuators. Thanks to their small size, the flow dividers can be placed in the nacelle.

Advantageously, the electro-hydrostatic actuation system comprises a second actuation assembly identical to the first actuation assembly and a main volumetric flow divider connecting the motor pump to each of the first and second actuation assemblies. The main volumetric flow divider is then configured to supply the fluid received from the motor pump equally to the first and second actuation assemblies.

In this case, the flow dividers of the first and second actuation assemblies will advantageously be placed in the nacelle so as to balance the pressure losses in the conduits between the main volumetric flow divider and the actuators connected to them.

The thrust reverser device according to the disclosure may comprise one or more of the following characteristics, taken separately or in combination:
- each actuation assembly comprises a pair of actuators and is configured to move a first and a second movable cover of the thrust reverser device respectively, the actuators of the same pair of actuators being intended to be attached to opposite ends of the same movable cover;
- each actuation assembly comprises a triplet of actuators and is configured to move a first and a second movable cover of the thrust reverser device respectively, the actuators of the same triplet of actuators being intended to be regularly attached between two opposite ends of the same movable cover;
- the volumetric flow divider or dividers of the actuation assemblies and the main volumetric flow divider are of the gear type;
- each volumetric flow divider of an actuation assembly comprises an internal pressure limiter;
- the motor pump comprises a synchronous electric motor with permanent magnets associated with an axial piston bidirectional stationary displacement pump;
- the electro-hydrostatic actuation system comprises a safety device arranged between the motor pump and the volumetric flow divider of the first actuation assembly, the safety device being configured to prevent an activation of the volumetric flow divider outside the landing phase of the aircraft, the safety device comprising an isolating valve and a control valve;
- the safety device is arranged between the motor pump and the main volumetric flow divider, the safety device being configured to prevent an activation of the main volumetric flow divider outside the landing phase of the aircraft;
- the actuators are telescopic actuators;
- the electro-hydrostatic actuation system comprises conduits each connecting an actuator to a volumetric flow divider and a hydraulic fuse arranged on each conduit.

The thrust reverser device is a grid thrust reverser device or a gate thrust reverser device.

The disclosure also concerns an aircraft comprising such a thrust reverser device.

DESCRIPTION OF THE DRAWINGS

The disclosure will be better understood and other details, characteristics and advantages of the present disclosure will become clearer from the following description made by way of non-limiting example and with reference to the attached drawings, in which.

The elements having the same functions in the different embodiments have the same references in the figures.

DETAILED DESCRIPTION

The present disclosure relates to a thrust reverser device for an aircraft turbojet engine nacelle comprising an electro-hydrostatic actuation system. In particular, the disclosure applies to any thrust reverser device comprising at least one cover movable between a retracted position and a deployed position relative to the nacelle, the movable cover or covers being moved by such an electro-hydrostatic actuation system.

The disclosure is equally applicable to the grid-type thrust reverser devices or to the door-type thrust reverser devices.

Figure 1:
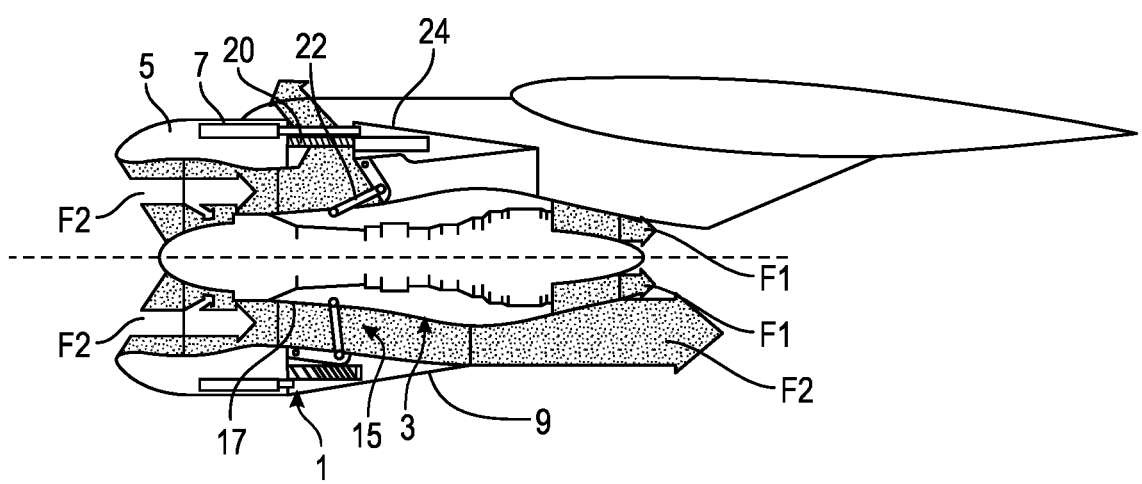
FIG. 1, which has already been described, shows a longitudinal sectional view of a nacelle equipped with a thrust reverser device with grids according to the prior art.
Figure 2:
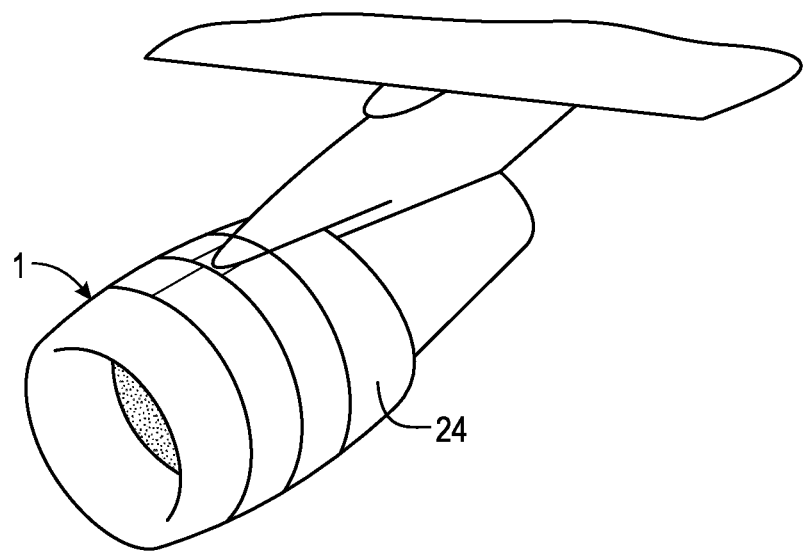
FIG. 2, already described, shows a three-dimensional view of the nacelle shown in FIG. 1, equipped with a thrust reverser cover in a direct jet position.
Figure 3:
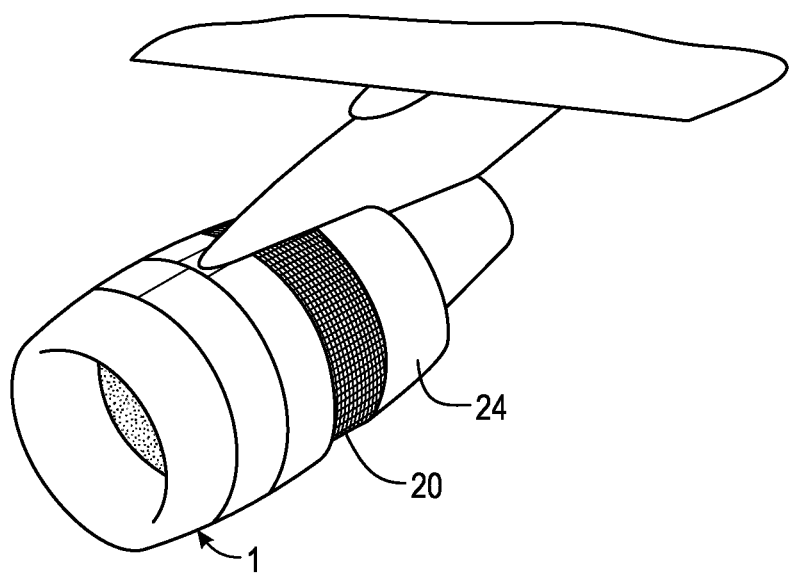
FIG. 3, already described, shows the nacelle of FIG. 2 with the thrust reverser cover in a reverse jet position.
Figure 4:
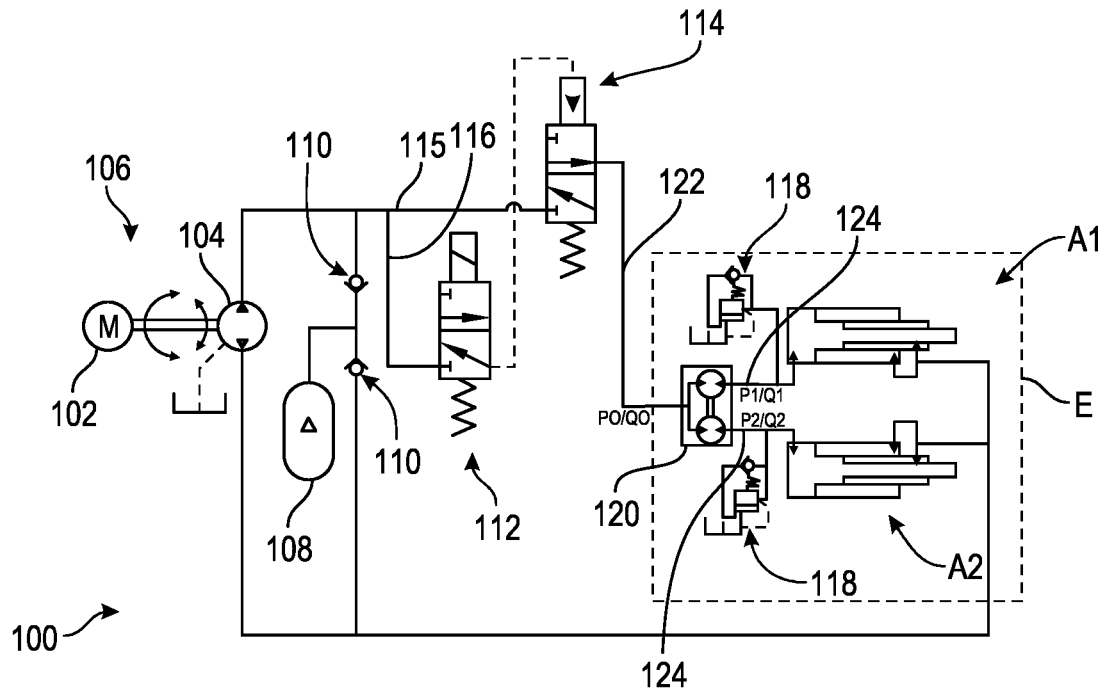
FIG. 4 shows schematically a control circuit for a first embodiment of an electro-hydrostatic actuation system according to the disclosure, FIG. 5 schematically illustrates a second embodiment of an electro-hydrostatic actuation system according to the disclosure, and FIG. 6 schematically illustrates a third embodiment of an electro-hydrostatic actuation system according to the disclosure, FIGS. 4, 5 and 6 use the symbols commonly used for hydraulic circuits.
Figure 5:
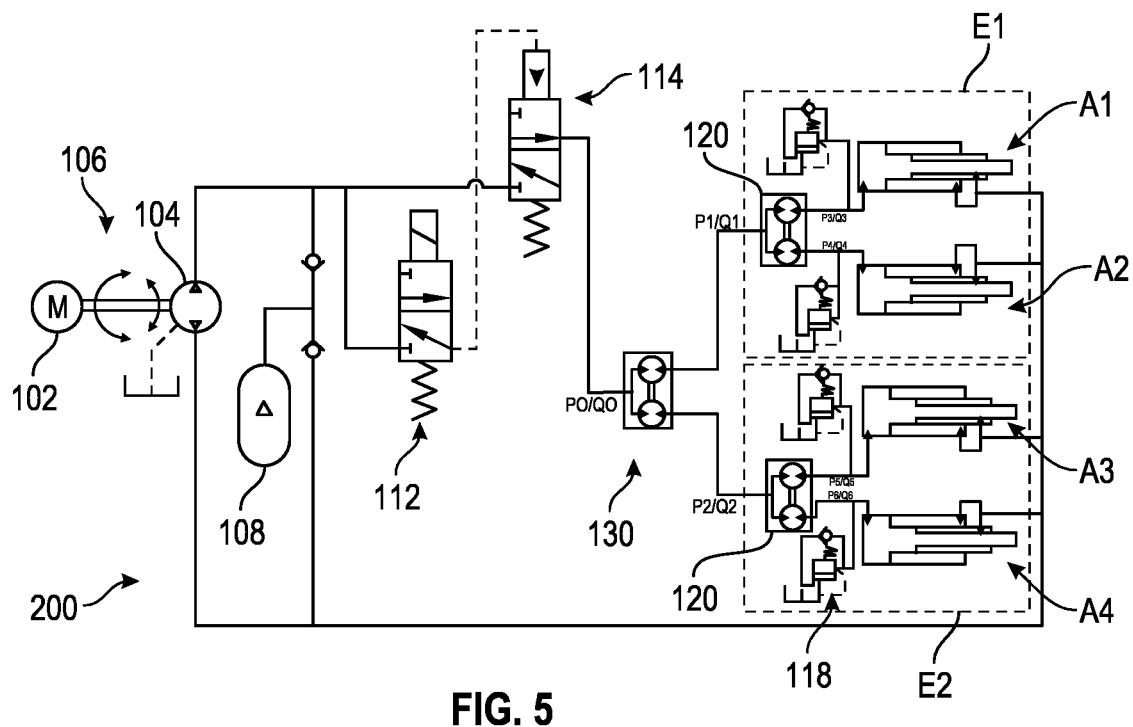
Figure 6:
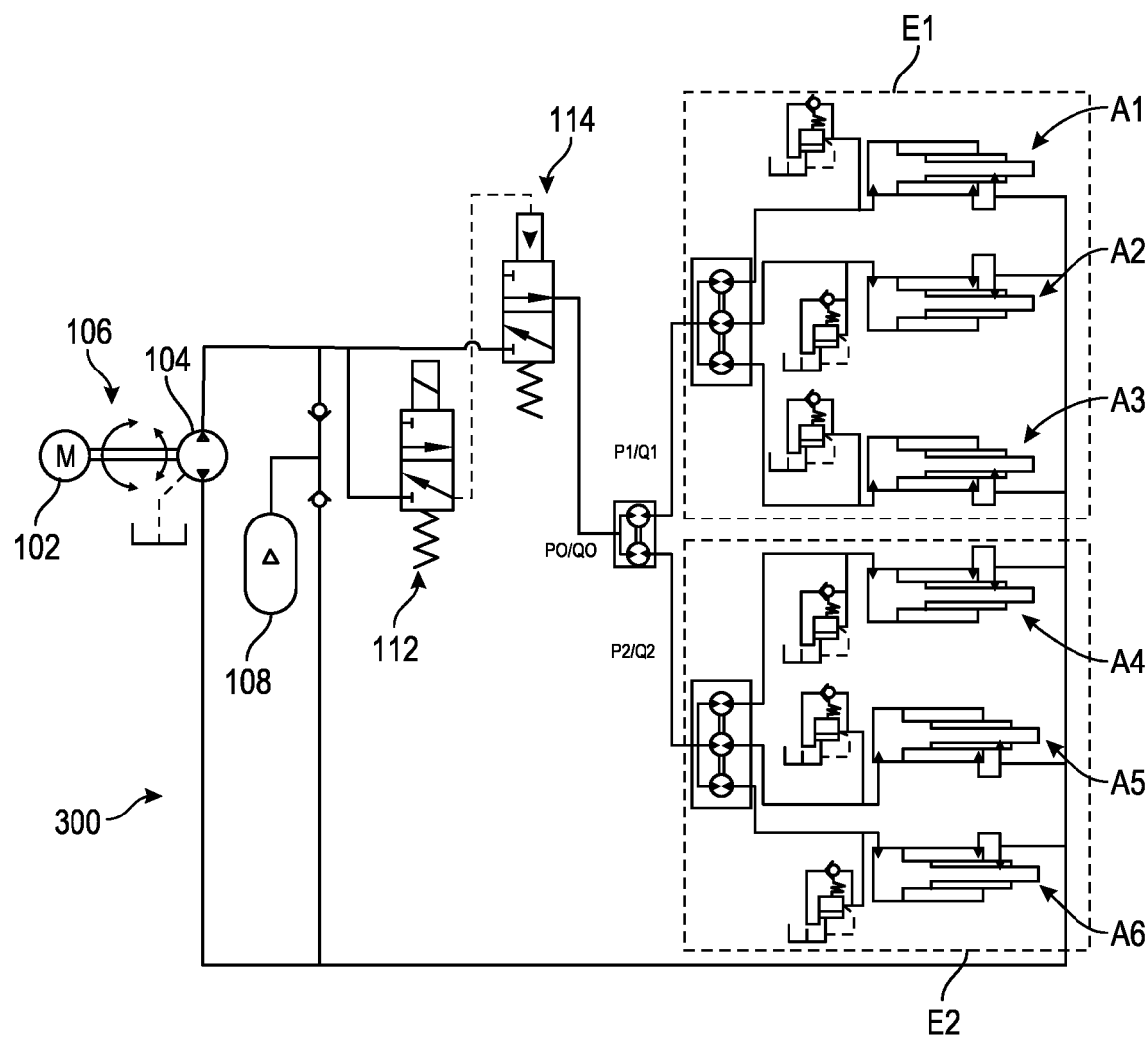

FIGS. 4, 5 and 6 illustrate embodiments of an electro-hydrostatic actuation systems for thrust reverser device according to the disclosure.

Whichever embodiment is illustrated, the actuation system comprises an electric motor 102 and a stationary displacement pump 104 forming a motor pump assembly 106. The pump 104 is preferably a bidirectional stationary displacement axial piston pump.

The electric motor 102 is a three-phase electric motor, of the permanent magnet synchronous motor type, associated with the hydraulic pump, i.e. it is adapted to convert the electrical power of the aircraft into mechanical power (rotation and torque) for the stationary displacement pump 104. The electric motor 102 is controlled by a motor control electronics (MDE) which consists of circuitry necessary to provide the control of the EHA electric motor and comprises the circuits necessary to interface with the electrical network of the aircraft to convert a variable frequency three phase supply, for example 115V AC (nominal), to a DC bus. The DC bus supplies the inverter, which is switched to control the current in the phase windings of the electric motor.

Alternatively, the electric motor can be an asynchronous motor and the pump is a variable displacement pump. In this case, instead of controlling the speed of the electric motor, a control electronic is configured to control the inclination of the cam plate of such a pump.

The pump 104 is configured to operate in all four quadrants, in both directions, motor and pump.

This motor pump assembly 106 is configured to supply the fluid flow rate and pressure to the system. The combination of a permanent magnet synchronous electric motor and a bi-directional stationary displacement axial piston pump ensures the best efficiency and the best performances for a motor pump assembly, as well as a high reliability.

The actuation system also comprises a gas accumulator 108 arranged in parallel with the motor pump and two non-return valves 110 to compensate for the differential volume between the annular and solid chamber of the actuators, to compensate for the thermal expansion of the fluid, to compensate for the dynamic leakage and to guarantee the minimum supply pressure for the pump 104 in order to prevent the cavitation of the pump.

Alternatively, the gas accumulator can be replaced by a hydraulic reservoir or tank associated with a booster pump guaranteeing a sufficient pressure upstream of the pump to ensure the correct operation.

In addition, the actuation system comprises an isolating valve 112 and a control valve 114 which are known per se and through which pass two hydraulic conduits 115, 116 coming from the pump 104. Such valves comprise a sliding valve contained in a hydraulic block. The dispenser of the isolating valve 112 allows the control valve 114 to be activated, so it does not need to let much flow rate through, unlike the dispenser of the control valve 114, which lets the flow rate and the pressure through to ensure that the fluid passes through with as little pressure loss as possible. However, the dispenser of the isolating valve 112 must be as tight as possible to prevent an inadvertent activation of the dispenser of the control valve 114. The dispenser of the isolating valve 112 is smaller than the dispenser of the control valve 114.

These isolating 112 and control 114 valves act as safety devices allowing to prevent the inadvertent actuation of the actuators and therefore the displacement of the movable cover of the thrust reverser device, for example outside the landing phase of the aircraft, particularly in mid-flight. In this way, they allow the actuation system to comply with the requirements required in this field of application with regard to inadvertent deployment of the movable covers.

With reference to FIG. 4, two hydraulic actuators A1, A2 of the actuation system 100 are shown, preferably of the gear type, known per se, such as asymmetric cylinders, the large chamber of which is used to deploy the flaps.

In order to ensure the energy consumption throughout the actuator stroke, the two actuators A1, A2 are preferably telescopic, i.e. adapted to limit the flow rate once the load is reduced.

The two actuators A1, A2 are adapted and intended to move a movable cover of a thrust reverser device equipping an aircraft nacelle relative to the nacelle between a retracted position or direct jet position and a deployed position or reverse jet position. For example, they are particularly suitable for sliding a cover on a grid-type thrust reverser.

In this case, the two actuators A1, A2 are preferably each attached to one end of the cover.

Preferably, each actuator A1, A2 of the actuating device comprises a pressure limiter 118 arranged on each solid chamber allowing to ensure the synchronization of the actuators and to avoid a pressure amplification effect in the event of failure of one of them.

In addition, the actuators are equipped with an internal locking system to comply with the safety requirements of the thrust reverser system.

Referring to FIG. 4, the actuation system according to the first embodiment also comprises a volumetric flow divider 120 allowing to ensure the synchronization of the actuators A1, A2.

The volumetric flow divider 120 comprises an inlet connected to the motor pump by an inlet conduit 122 and at least two outlets, each connected to an actuator A1, A2 by an outlet conduit 124. The volumetric flow divider 120 is configured to receive a fluid with an inlet flow rate and pressure, and to substantially equitably supply the fluid to the actuators with an outlet flow rate and pressure. In other words, it is configured to divide the fluid flow equally whatever the inlet pressure. For the purposes of the disclosure, "substantially equitable" means that the volumetric flow divider supplies the fluid to the actuators with a difference in output flow rates of less than 10%, preferably less than 5%, and even more preferably in a strictly identical manner.

Preferably, the volumetric flow divider is of the gear type allowing to ensure the very precise synchronization between the actuators. In fact, the precision is such that the difference in output flow rates is less than 1%. The volumetric flow dividers ensure the same flow rate with a great precision to all the actuators. In addition, they have the advantage of not being affected by the loads on the cover of the reverser device and offer a high precision.

The volumetric flow divider 120 and the two actuators form an actuation assembly E.

Thus, according to the embodiment illustrated in FIG. 4, the pressure P0 and the flow rate Q0 of fluid coming from the pump 104 will be divided in two by the volumetric flow divider 120 towards the first actuator A1 with a pressure P1 and the flow rate Q1 and towards the second actuator A2 with a pressure P2 and the flow rate Q2. The difference in flow rate between Q1 and Q2 is a maximum of 1%.

Preferably, the volumetric flow divider 120 is equipped with an internal pressure limiter to ensure that the two resulting pressures P1, P2 are equal.

The motor pump assembly is configured to supply a demand for flow rate and pressure to the actuators of the electro-hydrostatic actuation system. This assembly allows to regulate the speed and pressure variation by means of a regulation loop contained in the motor unit. Such an electro-hydrostatic actuation system can also allow to ensure the braking of the actuators at speed using a braking resistor contained in the control electronics.

At the beginning of the stroke of the cover, and therefore of the actuators, the loads are high and antagonistic. The motor pump is adapted to supply a maximum pressure for this early stage of the stroke. But when the movable cover or covers start to open, the loads help the movement and the flow rate demand is high, so it is necessary to reduce or control this demand. The electro-hydrostatic actuation system also allows the end-of-stroke loads to be controlled via a control loop so as to minimise the pressure build-up at full deployment.

The actuation system according to the disclosure is configured to adapt the pressure and the flow rate demand instantaneously.

Referring to FIG. 5, which illustrates a second embodiment of an electro-hydrostatic actuation system according to the disclosure, this comprises two actuation assemblies E1, E2, as defined above. This electro-hydrostatic actuation system comprises four actuators A1, A2, A3, A4 and two volumetric flow dividers 120 allowing to ensure the synchronization of the actuators A1, A2, A3, A4.

Preferably, the thrust reverser device comprises two movable covers and the actuators of the same actuating assembly are preferably attached to opposite ends of the same cover. The actuators of an actuation assembly are designed to move a right-hand cover, while the actuators of the other actuation assembly are designed to move a left-hand cover.

Alternatively, the thrust reverser device comprises only a movable cover. In this case, the actuators A1, A2, A3 and A4 are attached to the cover in such a way as to be evenly spaced angularly, in order to allow a balanced distribution of the actuating forces on the cover of the thrust reverser device. Advantageously, two of the actuators, for example A1 and A4, will each be attached to one end of the cover in order to obtain the best load distribution and also to avoid deformations of the cover.

According to this second embodiment, the electro-hydrostatic actuation system also comprises another volumetric flow divider, hereinafter referred to as the main volumetric flow rate divider 130, connecting the motor pump to each of the first and second actuation assemblies E1, E2.

The main volumetric flow divider 130 is configured to supply the fluid received from the motor pump equally to the first and second drive assemblies E1, E2.

The assembly of the volumetric flow dividers 120, 130 ensure that the actuators are synchronized.

According to this second embodiment, the pressure P0 and the flow rate Q0 coming from the pump 104 are divided into two lines by the main volumetric flow divider 130: one for the first actuating assembly E1 with the pressure P1 and a flow rate Q1 and the other for the second actuating assembly E2 with a pressure P2 and a flow Q2. The difference in flow rate Q2-Q1 between these two lines is within +/−1%.

In the same way, the pressure P1 and the flow rate Q1 are divided by the volumetric flow divider 120 of the first actuation assembly E1 into a pressure P3 and a flow rate Q3 on one line, for the actuator A1, and on the other line into a pressure P4 and a flow rate Q4, for the actuator A2. The difference between Q3 and Q4 is 1% maximum in absolute terms.

In the same way, the pressure P2 and the flow rate Q2 are divided by the volumetric flow divider 120 of the second actuation assembly E2 into a pressure P5 and a flow rate Q5 on one line, for the actuator A3, and on the other line into a pressure P6 and a flow rate Q6, for the actuator A4. The difference between Q5 and Q6 is 1% maximum in absolute terms.

Each volumetric flow divider 120, 130 is preferably equipped with an internal pressure limiter so as to ensure that the two resulting pressures across a flow divider are equal.

FIG. 6 illustrates a third embodiment of an electro-hydrostatic actuation system according to the disclosure. This differs from that of FIG. 5 in that each actuation assembly E1, E2 each comprises a triplet of actuators A1, A2, A3 and A4, A5, A6 for moving preferably two movable covers of a thrust reverser device. The actuators of the same triplet of actuators are intended to be regularly attached between two opposite ends of the same movable cover, one triplet for a right-hand cover and one triplet for a left-hand cover.

Alternatively, the thrust reverser device comprises a single movable cover. In this case, the actuators A1, A2, A3, A4, A5 and A6 are attached to the cover in such a way as to be evenly spaced angularly, in order to allow a balanced distribution of the actuating forces on the cover of the thrust reverser device.

The volumetric flow divider 120 of the first actuation assembly E1 allows to ensure the synchronization of the actuators A1, A2, A3, while the volumetric flow divider 120 of the second actuation assembly E2 allows to ensure the synchronization of the actuators A4, A5, A6.

In the same way as for the second embodiment in FIG. 5, the main volumetric flow divider 130 is configured to supply the fluid received from the motor pump equally to the first and second drive assemblies E1, E2.

The assembly of the volumetric flow dividers 120, 130 ensure the synchronization of the assembly of the actuators.

The invention claimed is:

1. A thrust reverser device for an aircraft turbojet engine nacelle comprising a first movable cover configured to move between a retracted position and a deployed position with respect to the nacelle and an electro-hydrostatic actuation system, the electro-hydrostatic system comprising a motor pump, and a first actuation assembly, comprising:
   a series of at least two actuators configured, each of the at least two actuators being attached to the first movable cover of the thrust reverser device and to move the first movable cover between a retracted position and a deployed position relative to the nacelle; and
   a volumetric flow divider having an inlet connected to the motor pump and at least two outlets, a first of the at least two outlets being connected to a first of the at least two actuators and a second of the at least two outlets being connected to a second of the at least two actuators, the volumetric flow divider being configured to receive a fluid and to supply each of the at least two actuators with an equal flow rate.

2. The reverse thrust device according to claim 1, further comprising a second movable cover configured to move between a retracted position and a deployed position with respect to the nacelle, wherein the electro-hydrostatic actuation system further comprises a second actuation assembly identical to the first actuation assembly and a main volumetric flow divider connecting the motor pump to each of the first and second actuation assemblies, the main volumetric flow divider being configured to equitably supply the first and second actuation assemblies with the fluid received from the motor pump.

3. The thrust reverser device according to claim 2, wherein each actuation assembly comprises a pair of actuators and is configured to move a first and a second movable cover of the thrust reverser device, respectively, the actuators of the same pair of actuators being configured to be attached to opposite ends of the same movable cover.

4. The thrust reverser device according to claim 2, wherein the volumetric flow divider or dividers of the actuation assemblies and the main volumetric flow divider are of a gear type.

5. The thrust reverser device according to claim 2, wherein each volumetric flow divider of the actuation assemblies comprises an internal pressure limiter.

6. The thrust reverser device according to claim 1, wherein the motor pump comprises a permanent magnet synchronous electric motor associated with an axial piston bidirectional stationary displacement pump.

7. The thrust reverser device according to claim 1, wherein the electro-hydrostatic actuation system comprises a safety device arranged between the motor pump and the volumetric flow divider of the first actuation assembly, the safety device being configured to prevent an activation of the volumetric flow divider outside the landing phase of the aircraft, the safety device comprising an isolating valve and a control valve.

8. The thrust reverser device according to claim 2, wherein the electro-hydrostatic actuation system comprises a safety device arranged between the motor pump and the volumetric flow divider of the first actuation assembly, the safety device being configured to prevent an activation of the volumetric flow divider outside the landing phase of the aircraft, the safety device comprising an isolating valve and a control valve, and wherein the safety device is arranged between the motor pump and the main volumetric flow divider, the safety device being configured to prevent an activation of the main volumetric flow divider outside the landing phase of the aircraft.

9. The thrust reverser device according to claim 1, wherein the actuators are telescopic actuators.

10. The thrust reverser device according claim 1, wherein the electro-hydrostatic actuation system comprises conduits each connecting an actuator to a volumetric flow divider and a hydraulic fuse arranged on each conduit.

11. An aircraft comprising a thrust reverser device according to claim 1.

* * * * *